Patented Jan. 17, 1950

2,494,930

UNITED STATES PATENT OFFICE 2,494,930

IODINATED SULFONAMIDE

Ramon de Montaner, Barcelona, Spain

No Drawing. Original application March 9, 1944, Serial No. 525,780. Divided and this application November 26, 1948, Serial No. 62,221. In Spain March 12, 1943

1 Claim. (Cl. 260—397.7)

The present application is a division of co-pending application, S. N. 525,780, filed March 9, 1944, and is concerned more particularly with the new sulfa compound, p-aminobenzenesulfonamido-p-iodobenzene:

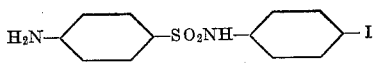

As pointed out in the parent application, a characteristic feature of the aforesaid new compound of the present invention is its high therapeutic activity and concomitant low toxicity.

A preferred method of preparing the said new compound of the present invention involves the reaction between a sulfamidic compound, such as p-aminobenzene sulfonamide or any of its halogenated derivatives, e. g. p-aminobenzene sulfo-chloride, with iodine or an iodinated compound, it being possible to use advantageously those iodinated derivatives which result from the introduction of iodine into a benzene nucleus.

According to the present invention, the iodinated compound to be combined with the sulfamide may also contain an amino group; thus, for example, p-iodoaniline may be employed. Use may also be made in this regard of a benzene sulfo-halide which contains in para position a substituent which is convertible into an amino group, as well as an iodinated compound which contains an amino group.

The iodinated compound, for example p-iodoaniline, may be prepared as follows:

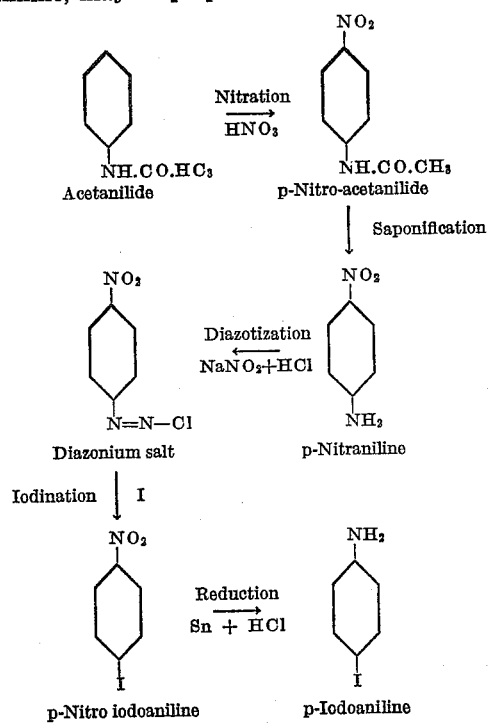

The following illustrative example sets forth in detail a preferred embodiment of the invention, starting from a benzene sulfo-halide:

Equal parts of p-acetylaminobenzene sulfo-chloride and p-iodoaniline are dissolved in a suitable solvent, the solution being stirred and heated until the reaction is completed. As a result of this reaction, p-acetylamino-benzene sulfonamido p-iodobenzene is formed, and this is separated by precipitation:

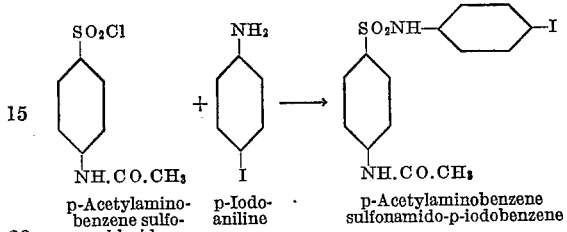

p-Acetylamino-benzene sulfo-chloride    p-Iodo-aniline    p-Acetylaminobenzene sulfonamido-p-iodobenzene This product is saponified by boiling with dilute hydrochloric acid and the resultant products are neutralized with soda, producing the new compound

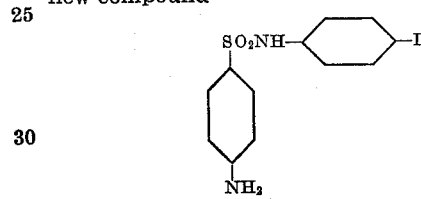

p-Aminobenzene sulfonamido-p-iodobenzene

Similarly, the sodium salt

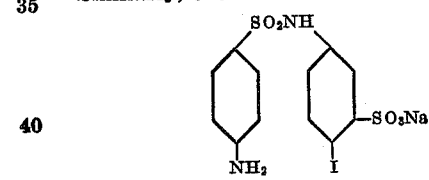

is obtained by the introduction of the —SO₃Na group into the molecule, these compounds being characterized by their notable therapeutic properties, as they are perfectly tolerated by the human organism and have absolutely no poisonous properties.

The foregoing example is wholly exemplary in character and it will be understood that there may be introduced also those variations of detail or execution which do not alter the essential characteristics of the invention.

Having thus disclosed the invention, what is claimed is:

The compound of the formula

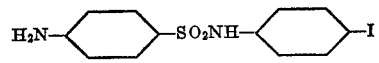

RAMON DE MONTANER.

(References on following page)

REFERENCES CITED

The following references are of record in the file of this patent:

UNITED STATES PATENTS

| Number | Name | Date |
|---|---|---|
| 2,248,911 | Behnisch | July 8, 1941 |

OTHER REFERENCES

Northey: "Chemical Reviews," vol. 27 (1940), pp. 147, 148, 188 and 189.

Long et al.: "J. Am. Chem. Soc.," vol. 63, June 1941, page 1587.

Marchant et al.: "Can. J. Research," vol. 20B (1942), pp. 6 and 7.

Northey: "The Sulfonamides and Allied Compounds" (1948), Reinhold Publication Co., pp. 58, 606 and 609.